United States Patent [19]

Akao et al.

[11] 4,337,285
[45] Jun. 29, 1982

[54] WRAPPING MATERIAL FOR LIGHT-SENSITIVE MATERIALS

[75] Inventors: Mutsuo Akao; Kenzo Kashiwagi, both of Minami-ashigara, Japan

[73] Assignee: Fuji Photo Film Co., Ltd., Minami-ashigara, Japan

[21] Appl. No.: 180,726

[22] Filed: Aug. 25, 1980

[30] Foreign Application Priority Data

Aug. 23, 1979 [JP] Japan .............................. 54-107371

[51] Int. Cl.$^3$ ..................... B65D 85/00; B32B 5/16; B32B 27/06; B32B 27/16
[52] U.S. Cl. ..................................... 428/35; 156/229; 428/200; 428/201; 428/207; 428/208; 428/332; 428/334; 428/339; 428/349; 428/354; 428/356; 428/461
[58] Field of Search ................. 428/461, 518, 515, 35, 428/216, 172, 349, 516, 328, 218, 200, 356, 201, 207, 208, 354, 356, 334, 332, 339; 156/229

[56] References Cited

U.S. PATENT DOCUMENTS

| | | | |
|---|---|---|---|
| 3,287,202 | 11/1966 | Petriello | 428/328 X |
| 3,322,613 | 5/1967 | Rasmussen | 428/518 |
| 3,445,055 | 5/1969 | Port et al. | 428/216 X |
| 3,468,753 | 9/1969 | Vincent et al. | 428/328 |
| 3,816,230 | 6/1974 | Carreras et al. | 428/349 X |
| 3,973,063 | 8/1976 | Clayton | 428/172 X |
| 4,147,291 | 4/1979 | Akao et al. | 428/461 X |
| 4,258,848 | 3/1981 | Ahao et al. | 428/218 X |

*Primary Examiner*—Thomas J. Herbert, Jr.
*Attorney, Agent, or Firm*—Sughrue, Mion, Zinn, Macpeak and Seas

[57] ABSTRACT

A wrapping material for light-sensitive materials comprising at least two monoaxially drawn films composed of high density polyethylene having a density of at least 0.94 g/cm$^3$, which are bonded with an adhesive layer containing an aluminium paste or an aluminium powder so that drawing axes of the films cross each other at an angle of from 45° to 90°.

17 Claims, 13 Drawing Figures

WRAPPING MATERIAL FOR LIGHT-SENSITIVE MATERIALS

BACKGROUND OF THE INVENTION

This invention relates to wrapping materials for light-sensitive materials, and particularly to wrapping materials for light-sensitive materials which satisfy various characteristics desired for wrapping materials, such as physical strength, light-shielding properties, moisture resistance, antistatic properties and heat-shielding properties, etc., and which can be produced economically.

In general, wrapping materials which completely shield light are used for wrapping light-sensitive materials such as photographic films or printing paper, etc., because the light-sensitive materials lose their qualities and value if exposed to light. When using such wrapping materials as packaging bags, it is necessary that they have sufficient physical strength, namely, breaking strength, tear strength, bursting strength, surface strength and bag breaking strength, etc., depending on the size and weight of object to be packaged. Furthermore, in the case of packaging light-sensitive materials in bags of such wrapping materials, it is necessary that the wrapping materials have a heat-sealing property and heat-sealing strength, in order to achieve light-shielding and moisture proofing by completely sealing the opening part thereof by heat-sealing. When the opening part of the package bags is sufficiently sealed by heat-sealing, the heat-sealed part substantially does not leak the light to the inside, but as further protection in practical embodiments, the heat-sealing part is folded two or three times. Moreover, it is necessary that the wrapping materials have an antistatic property, in order to prevent generation of electric charges caused by friction between the light-sensitive materials in the packaging bag and the wrapping material.

Hitherto, as wrapping materials as described above, compound laminates composed of a low density polyethylene film containing carbon black or pigment, and a paper, aluminum foil or cellophane, etc., have been known in general.

The following steps have been taken for these wrapping materials so as to satisfy the above-described characteristics.

(1) Light-shielding property: Carbon black is added. In the case of adding it in a particularly large amount (by which light-shielding can be attained with a thin layer), low density polyethylene, ethylene-acrylic acid ester copolymer and ethylene-vinyl acetate copolymer, etc., are used.

(2) Moisture resistance: Low density polyethylene films having large moisture permeability and ethylene-acrylic acid ester copolymer or ethylene-vinyl acetate copolymer films can be used, but must be used as a relatively thick layer or laminated with an aluminium foil. However, high density polyethylene films can be utilized with only a slightly increased thickness, because the moisture permeability thereof is only about ⅓ that of the low density polyethylene films.

(3) Physical strength: Polyethylene is laminated with paper in order to increase tearing strength, synthetic rubber is added to low density polyethylene, or the total thickness of the film is increased.

(4) Antistatic property: Carbon black is added, by which it is obtained simultaneously with light-shielding. The same purpose can be attained by laminating with an aluminium foil, too.

However, such prior packaging bags have drawbacks in that they too often tear or break during the packaging operation, or are easily extended by pulling.

In order to overcome these drawbacks, it is necessary to increase the thickness of packaging bags, and consequently such packages may become bulky, heavy, and expensive.

On the other hand, several proposals concerning wrapping materials having the above-described characteristics and, particularly, improved physical strength have been done.

For example, Japanese Utility Model Registration Application (OPI) No. 133631/77 which corresponds to U.S. Pat. No. 4,147,291 discloses packaging bags for light-sensitive materials which comprise a cross laminate film consisting of two monoaxially stretched high density polyethylene films the drawing directions of which cross each other at an angle of from 45° to 90° and a low density polyethylene film bonded to said laminate film. Similarly, Japanese Utility Model Registration Application (OPI) No. 21168/80 which corresponds to U.S. Pat. No. 4,258,848 discloses wrapping materials for light-sensitive materials which comprise two or more high density polyethylene films drawn monoaxially within a prescribed drawing ratio, which are bonded with an adhesive layer such that the drawing axes thereof cross each other at an angle of from 45° to 90°. FIG. 1 and FIG. 2 each indicate a cross-sectional view which indicates a layer construction of wrapping material of the latter type. In the drawings, 1' is a monoaxially drawn high density polyethylene film containing a light-shielding agent, 2 is an adhesive layer and 4 is an aluminium foil.

Hitherto, materials prepared by knitting lengthwise and breadthwise high density polyethylene flat yarns each having a different drawing direction (as described. e.g., in U.S. Pat. Nos. 3,445,055 and 3,816,230), materials prepared by heat-sealing a network of thermoplastic films by means of an embossed roll (described, e.g., in U.S. Pat. No. 3,973,063), and materials prepared by bonding high density polyethylene films each having a different drawing direction through an intermediate layer (described, e.g., in U.S. Pat. No. 3,322,613), etc., have been known as wrapping materials for other than light-sensitive materials. However, such drawn high density polyethylene films have not been utilized as wrapping materials for light-sensitive materials. In this sense, the wrapping materials for light-sensitive materials as disclosed in Japanese Utility Model Registration Application (OPI) Nos. 133631/77 and 21168/80 are unique. When the above-described wrapping materials for light-sensitive materials are used, a further improvement can be obtained as compared with the prior wrapping materials for light-sensitive materials, because they are particularly excellent in physical strength, such as tearing strength or bursting strength, etc., and satisfy various characteristics, including the light-shielding property and heat-shielding property, and economic considerations.

However, when a wrapping material as indicated in FIG. 1 is used, moisture resistance is not always sufficient. Therefore, in case of packaging light-sensitive materials which require moisture resistance, wrapping materials comprising an aluminium foil 4 as shown in Table 2 have been necessarily used.

In this case, however, since it is necessary to provide adhesive layers 2 on both sides of the aluminium foil 4, the total thickness of the material is increased, the layer construction becomes complicated, and there is a disadvantage in that the cost increases as compared with a material as indicated in FIG. 1.

SUMMARY OF THE INVENTION

An object of this invention is to provide novel wrapping materials from which the above-described drawbacks in the prior wrapping materials have been eliminated, and more particularly to provide economical wrapping materials which are excellent in light-shielding property, flexibility, moisture resistance, gas-shielding property, physical strength, antistatic property and heat-sealing property.

The above-described object of this invention can be attained by bonding at least two monoaxially drawn films composed of high density polyethylene having a density of at least 0.94 g/cm$^3$ with an adhesive layer containing an aluminium paste or an aluminium powder so that the drawing axes (that is, the direction of stretching) thereof cross each other at an angle from 45 to 90°.

Figure 1:
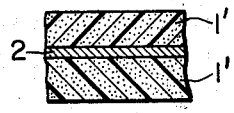
FIG. 1 and FIG. 2 are cross-sectional views of prior wrapping materials.

The numbers in the drawings identify features as follows:

1: A monoaxially drawn high density polyethylene film.
1': A film obtained by adding a light-shielding agent to 1.
2: An adhesive layer.
3: An adhesive layer to which an aluminium paste or aluminium powder is added.
3': An adhesive layer obtained by adding a light-shielding agent to 3.
4: An aluminium foil.
5: A flexible sheet layer capable of being printed upon.
6: A light-sensitive material.

DETAILED DESCRIPTION OF THE INVENTION

Details of the present invention are illustrated by reference to examples thereof, as illustrated in the drawings.

Figure 3:
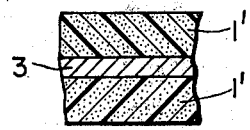
FIG. 3 to FIG. 12 are cross-sectional views of various embodiments of wrapping materials according to the present invention.
Figure 4:
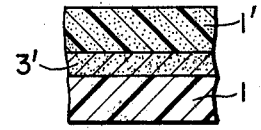

FIG. 3 illustrates an enlarged cross-sectional view of a typical embodiment of the wrapping materials for light-sensitive materials according to this invention, in which the reference numerals 1' and 1' each indicate a monoaxially drawn high density polyethylene film containing a light-shielding agent such as carbon black and 3 indicates an adhesive layer containing an aluminium paste or an aluminium powder.

Here, the high density polyethylene film 1' means a polyethylene film having a density of at least 0.94 g/cm$^3$, and preferably from 0.94 to 0.97 g/cm$^3$, which can be prepared by monoaxially drawing it to from 2 to 6 times its initial length, and preferably is drawn to from 2.2 to 4.2 times its initial length. The present wrapping materials are those prepared by bonding two or, if desired, more than two, of the above-described films 1' with the adhesive layer(s) 3, and bonding is carried out such that the drawing axes of both films cross each other at an angle of from 45 to 90°.

The adhesive layer 3 is composed of an extrusion type adhesive comprising thermoplastic resin (such as high density polyethylene, polypropylene, low density polyethylene, ethylene-ethyl acrylate copolymer (EEA) or ethylene-vinyl acetate copolymer (EVA), etc.), a water-soluble adhesive, or a hot-melt type adhesive (including wax), etc., to which the aluminium paste or aluminium powder, as well as pigments or coloring dyes, etc., are added alone or in a compound state.

The expression "compound state" refers to a state comprising a mixture of the aluminium paste or aluminium powder and one or more other light-shielding agents, such as a pigment (e.g., carbon black) or a dye.

As used herein, "aluminium paste" refers to a paste of aluminium powder, can be prepared, e.g., by a ball mill process in a presence of white spirit and a small amount of stearic acid. "Aluminium powder" refers not only to a powder prepared by pulverizing fused aluminium by an atomization method, granulation method, revolving disk dropping method, evaporation method, etc., but also to aluminium flakes prepared by crushing aluminium foil.

The particle size (average diameter) of the aluminium particles of the aluminium paste or the aluminium powder is generally from about 1 to 350$\mu$, and preferably is from 3 to 100$\mu$.

When dispersing the above-described aluminium paste or aluminium powder in the thermoplastic resin, the aluminium past or aluminium powder is added to the resin and a known method for stirring and blending is utilized in a step of melting with heat.

The aluminium paste or aluminium powder is preferably added so that the aluminium is present in an amount of from 0.3 to 12wt%, and more preferably from 1.5 to 7 wt%, based on the total weight of the adhesive layer, in view of the characteristics desired for the wrapping materials and the production costs. If the amount to be added is less than 0.3 wt%, adverse effects occur in the light-shielding property, moisture resistance, and antistatic property. If it is more than 12 wt%, though the above characteristics can be assured, adverse effects occur in physical strength, heat-sealing property, surface property, etc., and the production cost increases. The adhesive layer 3 containing the aluminium paste or aluminium powder preferably has a thickness of from about 5 to 60$\mu$, and more preferably from 7 to 20$\mu$.

Wrapping materials having the above-described construction according to the invention have advantages that all characteristics required for wrapping materials, such as light-shielding property, physical strength properties, such as tearing strength, film surface strength, etc., moisture resistance, antistatic property, flexibility, and heat-sealing property are satisfied, and the production cost is reduced compared with prior wrapping materials.

These excellent effects will be obvious with reference to the following examples.

EXAMPLE 1

Figure 2:
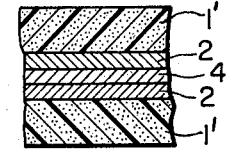

For a wrapping material according to the present invention as shown in FIG. 3, and for prior wrapping materials as shown in FIG. 1 and FIG. 2, experiments concerning the characteristics and production costs thereof were carried out as follows:

The wrapping material illustrated in FIG. 3 was produced by preparing two high density polyethylene films 1' having a thickness of 30μ by incorporating 3% of carbon black in a polyethylene film having a density of 0.96 g/cm³ and monoaxially drawing at a drawing rate of 3.5 times, and bonding them with an adhesive layer 3 composed of low density polyethylene containing 5 wt% (i.e., 5% of the total weight of the adhesive) the aluminium paste so that the drawing axes of the films cross each other at an angle of 90°.

For example, the coating of the adhesive layer 3 can be applied using an extrusion method in which pellets comprising a mixture of the aluminium paste and low density polyethylene are extruded using a T-die into a film form.

On the other hand, a wrapping material as illustrated in FIG. 1 was prepared by bonding the two monoaxially drawn high density polyethylene films 1' and 1' (the same as those in the wrapping material illustrated in FIG. 3, except that the thickness was 35μ) with an adhesive layer composed of low density polyethylene not containing aluminium paste or aluminium powder, so that the drawing axes cross each other at the angle of 90°. A wrapping material as illustrated in FIG. 2 was prepared by interposing an aluminium foil 4 having 7μ of the thickness between the above-described two monoaxially drawn high density polyethylene films 1' and 1 and bonding them with the above-described adhesive layer 2 so that the drawing axes of both films cross each other at the angle of 90°. The characteristics in the example were evaluated by the following evaluation methods.

(1) Total thickness of wrapping material: The thickness was measured with a micrometer according to JIS-P8118-1976.
(2) Antistatic property: After predetermined processes such as cutting or wrapping, the change in the quantity of charge is measured using a sector type electrometer (for example, that manufactured and sold by Shishido Shokai in Japan under trademark of Statiron).
(3) Light-shielding property: The light-shielding property against light of 80,000 lux was evaluated by the degree of fog formed on a highly sensitive film (for example, a photographic negative film for picture having an ASA sensitivity of 400).
(4) Moisture resistance: The weight of water permeated through a sample was measured with a permeation cup according to JIS-Z0208-1976.
(5) Heat-sealing property: Aptitude for practical machines (for example, that sold in U.S.A. under the trademark of Doboy Model HS-C Hand Sealer).
(6) Flexibility- JIS P-8125-1976.
(7) Tearing strength- JIS P-8116-1976.
(8) Film surface strength: JIS Z-0200-1976.

When the wrapping materials prepared as described above were evaluated by the above-described evaluation methods, results shown in Table 1 were obtained.

TABLE 1

| Embodiment | Material of this Invention FIG. 3 | Prior Material FIG. 2 | Prior Material FIG. 2 |
|---|---|---|---|
| Total Thickness (μ) | 70 | 80 | 110 |
| Characteristics of Wrapping Material | | | |
| Light-Shielding Property | A | B | A |
| Moisture Resistance | A | C | A |
| Antistatic Property | A | C | A |
| Heat-Sealing Property | A | A | B |
| Flexibility | A | A | B |
| Physical Strength | | | |
| Tearing Strength (length) | A | A | A |
| Tearing Strength (breadth) | A | A | A |
| Film Surface Strength | A | A | A |
| Production Cost Ratio | 95 | 100 | 130 |

In the Table, the symbol A indicates that the property was excellent, the symbol B indicates that the property was sufficient to meet the minimum limits for practical use, and the symbol C indicates that slight problems were encountered in the practical use thereof.

As is clear from the Table, the wrapping material of the present invention as illustrated in FIG. 3 satisfies all characteristics for wrapping materials, and the production cost is from 5 to 35% lower than that of the prior wrapping materials.

EXAMPLE 2

Next, the wrapping material was produced by preparing the same materials as in Example 1 described above, and bonding them in the same manner as in Example 1 described above, except that the drawing axes of the films crossed each other at an angle of 45°. When this wrapping material was evaluated by the same method as in Example 1 described above, results similar to those described in Table 1 were obtained, except that the tearing strength decreased from A to B.

In the above, though the present invention is illustrated with reference to the most preferred embodiment, the present invention is not limited to the above-described embodiment and various modifications can be carried out as described in the following.

FIGS. 4 through 12 show modified examples of the present invention. In these drawings, 3' is an adhesive layer obtained by adding a light-shielding agent to the above-described adhesive layer 3 containing the aluminium paste or aluminium powder, 1 is a monoaxially drawn high density polyethylene layer not containing the light-shielding agent, and 5 is a flexible sheet layer capable of printing.

As is shown in the drawings, the wrapping materials illustrated in FIGS. 4 through 7 consist of three layers, and the wrapping materials illustrated in FIGS. 8 through 12 consist of five layers.

As the light-shielding agent, coloring pigments, coloring dyes, $TiO_2$, $CaCO_3$ and clay other than the above-described carbon black can be used.

Figure 5:
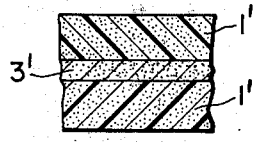
Figure 12:
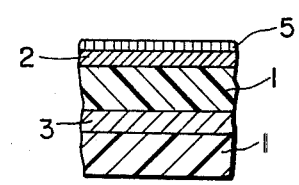

Selection of the wrapping material from these various kinds of wrapping material can be carried out based on consideration of the kinds or form of the light-sensitive materials to be packaged, requirements of printing and production cost, etc., from which considerations the most desirable wrapping material for a particular use can be selected. For example, when the light-shielding properties are particularly required, wrapping material as illustrated in FIG. 5 can be used. On the other hand, when the light-shielding property is not a particularly important requirement, a wrapping material as illustrated in FIG. 12 can be used.

Further, if necessary, it is of course possible to use these various wrapping materials as a compound wrapping material by laminating them.

Figure 6:
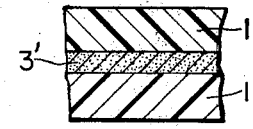
Figure 7:
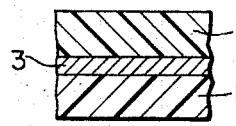
Figure 8:
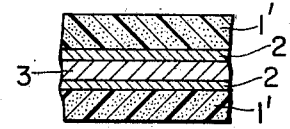
Figure 9:
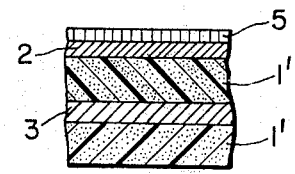
Figure 10:
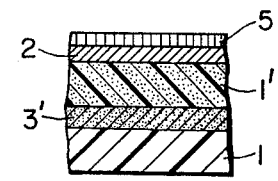
Figure 11:
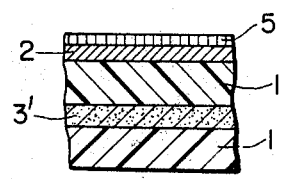

Moreover, two monoaxially drawn high density polyethylene films 1 and 1' may each be drawn to a different degree. The amount of carbon black, pigments or dyes as the light-shielding agent to be added can be varied depending upon the particular embodiment so that the light-shielding properties can be sufficiently ensured. In the wrapping materials comprising an adhesive layer 3 containing a light-shielding agent such as the aluminium paste or the aluminium powder, etc., as illustrated in FIGS. 7 and 8 and that comprising an adhesive layer 3' containing a light-shielding agent such as the aluminium paste or aluminium powder and carbon blacks, pigments or dyes, etc., as illustrated in FIGS. 6 and 11, even if a light-shielding agent is not added in the two monoaxially drawn high density polyethylene films 1, since the light-shielding property of the wrapping material is guaranteed by the adhesive layer, light-shielding agents such as carbon black, other pigments, or dyes need not be added to the polyethylene film 1. Further, antistatic agents such as surface active agents, etc., ultraviolet ray absorbing agents, antioxidants and lubricants, etc., may be added thereto.

Figure 13:
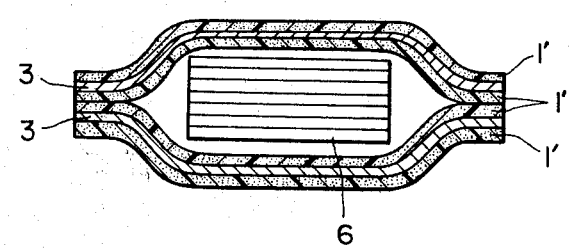
FIG. 13 is a cross-sectional view of a packaging bag which can be obtained using the wrapping material of the present invention.

Though the wrapping materials according to the present invention can be used in a sheet form, they are generally processed to make packaging bags. FIG. 13 illustrates an example in which the wrapping material of the present invention is used as a packaging bag. According to packaging bag produced in such a manner, heat-sealing can be carried out directly at a comparatively low temperature (180° C. or so), since a plurality of monoaxially drawn high density polyethylene films are used, and, consequently, light-sensitive materials 6 as contents are not badly affected by heat. Further, the wrapping material does not cause trouble, such as generation of fog of the light-sensitive materials, even if it contacts at ordinary times with the light-sensitive materials to rub them, because of having a high antistatic property.

As has been described in detail, the wrapping materials according to this invention comprise at least two monoaxially drawn high density polyethylene films, which are bonded with the adhesive layer containing aluminium paste or aluminium powder, so that the drawing axes of them cross each other at an angle of 45° to 90°. According to such wrapping materials, characteristics for wrapping materials are satisfied as described above, and they have a remarkable effect of producing at a low price.

While the invention has been described in detail and with reference to specific embodiments thereof, it will be apparent to one skilled in the art that various changes and modifications can be made therein without departing from the spirit and scope thereof.

What is claimed is:

1. A wrapping material for light-sensitive materials comprising at least two monoaxially drawn films composed of high density polyethylene having a density of at least 0.94 g/cm$^3$, which are bonded with an adhesive layer containing an aluminum paste or an aluminum powder wherein aluminum is present in an amount of from 0.3 to 12 wt% based on the total weight of the adhesive layer so that drawing axes of the films cross each other at an angle of from 45° to 90°.

2. A wrapping material for light-sensitive materials as in claim 1, wherein the aluminium is present in an amount of from 1.5 to 7 wt%, based on the total weight of the adhesive layer.

3. A wrapping material for light-sensitive materials as in claim 1, or 2, wherein the two monoaxially drawn films are composed of high density polyethylene having a density of from 0.94 to 0.97 g/cm$^3$.

4. A wrapping material for light-sensitive materials as in claim 1, or 2, wherein the monoaxially drawn films are drawn to from 2 to 6 times their initial length.

5. A wrapping material for light-sensitive materials as in claim 1, or 2, wherein the monoaxially drawn films are drawn to from 2.2 to 4.2 times their initial length.

6. A wrapping material for light-sensitive materials as in claim 1, or 2, wherein the adhesive layer additionally contains a light-shielding agent selected from the group consisting of coloring pigments, coloring dyes, $TiO_2$, $CaCO_3$, and clay.

7. A packaging bag prepared from a wrapping material as in claim 1, or 2.

8. A wrapping material for light-sensitive materials as in claim 1, or 2, wherein the average diameter of the aluminium particles of the aluminium paste or the aluminium powder is from about 1 to 350μ.

9. A wrapping material for light-sensitive materials as in claim 1, or 2, wherein the average diameter of the aluminium particles of the aluminium paste or the aluminium powder is from 3 to 100μ.

10. A wrapping material for light-sensitive materials as in claim 1, or 2, wherein the adhesive layer has a thickness of from about 5 to 60μ.

11. A wrapping material for light-sensitive materials as in claim 10, wherein the two monoaxially drawn films are composed of high density polyethylene having a density of from 0.94 to 0.97 g/cm$^3$.

12. A wrapping material for light-sensitive materials as in claim 10, wherein the monoaxially drawn films are drawn to from 2 to 6 times their initial length.

13. A wrapping material for light-sensitive materials as in claim 10, wherein the monoaxially drawn films are drawn to from 2.2 to 4.2 times their initial length.

14. A wrapping material for light-sensitive materials as in claim 1, or 2, wherein the adhesive layer has a thickness of from 7 to 20μ.

15. A wrapping material for light-sensitive materials as in claim 14, wherein the two monoaxially drawn films are composed of high density polyethylene having a density of from 0.94 to 0.97 g/cm$^3$.

16. A wrapping material for light-sensitive materials as in claim 14, wherein the monoaxially drawn films are drawn to from 2 to 6 times their initial length.

17. A wrapping material for light-sensitive materials as in claim 14, wherein the monoaxially drawn films are drawn to from 2.2 to 4.2 times their initial length.

* * * * *